United States Patent
Jiang et al.

(10) Patent No.: US 10,346,257 B2
(45) Date of Patent: Jul. 9, 2019

(54) METHOD AND DEVICE FOR DEDUPLICATING WEB PAGE

(71) Applicant: Huawei Technologies Co., Ltd., Shenzhen, Guangdong (CN)

(72) Inventors: Nan Jiang, Shenzhen (CN); Hui Zhang, Shenzhen (CN); Jia Wan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1090 days.

(21) Appl. No.: 14/581,464

(22) Filed: Dec. 23, 2014

(65) Prior Publication Data

US 2015/0142760 A1     May 21, 2015

Related U.S. Application Data

(63) Continuation of application No. PCT/CN2013/075121, filed on May 3, 2013.

(30) Foreign Application Priority Data

Jun. 30, 2012    (CN) .......................... 2012 1 0223009

(51) Int. Cl.
    *G06F 11/14*       (2006.01)
    *G06F 16/958*      (2019.01)

(52) U.S. Cl.
    CPC ........ *G06F 11/1453* (2013.01); *G06F 16/958* (2019.01)

(58) Field of Classification Search
    CPC ............. G06F 11/1453; G06F 17/3089; G06F 17/30156; G06F 3/0641; G06F 16/958
(Continued)

(56) References Cited

U.S. PATENT DOCUMENTS

2003/0154181 A1*   8/2003   Liu ...................... G06F 17/3071
2009/0028441 A1*   1/2009   Milo ................... G06F 17/2211
                                                        382/218
(Continued)

FOREIGN PATENT DOCUMENTS

CN          101093485 A     12/2007
CN          101102316 A      1/2008
(Continued)

OTHER PUBLICATIONS

Shu-rong Peng, et al., "The Application of MD5 to Remove the Repeated Pages", 2005, 2 pages.
(Continued)

*Primary Examiner* — Evan Aspinwall

(57) ABSTRACT

A method and a device is described for de-duplicating a web page. The method includes: extracting at least one core sentence from a target web page; mapping each core sentence to a unique numeric value to form a first numeric value set; determining an intersection set of the first numeric value set and each second numeric value set, and the number of numeric values included in each intersection set, and determining a maximum number of numeric values included in each intersection set; and when a ratio of the maximum number to a total number of numeric values in the first numeric value set is greater than a set threshold, processing the target web page as a duplicate web page. In embodiments of the present invention, during web page de-duplication processing, accuracy can be improved, an anti-noise capability can be enhanced, and a calculating scale can be reduced.

16 Claims, 5 Drawing Sheets

(58) Field of Classification Search
 USPC .......................................................... 707/700
 See application file for complete search history.

(56) References Cited

U.S. PATENT DOCUMENTS

2010/0145952 A1* 6/2010 Yoon ................. G06F 17/30011
 707/747
2010/0306204 A1* 12/2010 Chitiveli ............. G06F 17/3071
 707/752

FOREIGN PATENT DOCUMENTS

| CN | 101246501 A | 8/2008 |
| --- | --- | --- |
| CN | 102270244 A | 12/2011 |
| CN | 102375813 A | 3/2012 |
| CN | 102402537 A | 4/2012 |
| CN | 102799647 A | 11/2012 |

OTHER PUBLICATIONS

Minghui Zhang, et al., "A signature-based segmented mirror new paragraph approximation algorithms", Journal of Information, No. 1, 2005, 4 pages.

* cited by examiner

METHOD AND DEVICE FOR DEDUPLICATING WEB PAGE

CROSS-REFERENCE TO RELATED APPLICATIONS

This application is a continuation of International Application No. PCT/CN2013/075121, filed on May 3, 2013, which claims priority to Chinese Patent Application No. 201210223009.X, filed on Jun. 30, 2012, both of which are hereby incorporated by reference in their entireties.

TECHNICAL FIELD

The present invention relates to network communications technologies, and in particular, to a method and a device for de-duplicating a web page.

BACKGROUND

When a search engine is used to search for desired information, there are a large number of links with duplicate content or even dead links in a result returned by the search engine, so that it is very time-consuming and inconvenient for a user to acquire the information. Because the number of internet websites is enormous, a workload of a crawler, which is one of core modules of a search engine, and a size of data that is to be read and written by the crawler are also unimaginable. If web pages with duplicate content can be eliminated in a fast and high-accuracy manner, it can not only avoid feeding back duplicate information to the user, but also save system resources for subsequent processing.

In the prior art, a hash calculation is performed on a main body of a candidate web page, a set of web pages with stored hash values is retrieved, and it is determined whether the number of same hash values exceeds a given threshold. If the number of same hash values exceeds the given threshold, the candidate web page is considered as a duplicate web page. However, this manner is low in accuracy. It can only determine a web page with all words unchanged as a duplicate web page, and de-duplication processing cannot be performed on a new web page that is formed by deleting or adding some sentences on a basis of an original web page.

SUMMARY

The present invention provides a method and a device for de-duplicating a web page, which are used to improve accuracy of de-duplication.

One aspect of the present invention provides a method for de-duplicating a web page, including: extracting at least one core sentence from a target web page, where the core sentence refers to a sentence that includes main content information of the web page; mapping each core sentence to a unique numeric value to form a first numeric value set; determining an intersection set of the first numeric value set and each second numeric value set, and the number of numeric values included in each intersection set, and determining a maximum number of numeric values included in each intersection set, where the second numeric value set is a set that is formed by a numeric value to which a core sentence included in each web page in a predetermined candidate web page set is mapped; and when a ratio of the maximum number to a total number of numeric values in the first numeric value set is greater than a set threshold, processing the target web page as a duplicate web page.

Another aspect of the present invention provides a device for de-duplicating a web page, including: an extracting module, configured to extract at least one core sentence from a target web page, where the core sentence refers to a sentence that includes main content information of the web page; a mapping module, configured to map each core sentence to a unique numeric value to form a first numeric value set; a comparing module, configured to determine an intersection set of the first numeric value set and each second numeric value set, and the number of numeric values included in each intersection set, and determine a maximum number of numeric values included in each intersection set, where the second numeric value set is a set that is formed by a numeric value to which a core sentence included in each web page in a predetermined candidate web page set is mapped; and a de-duplicating module, configured to: when a ratio of the maximum number to a total number of numeric values in the first numeric value set is greater than a set threshold, process the target web page as a duplicate web page.

It can be known from the foregoing technical solutions that, in embodiments of the present invention, a core sentence is extracted, and because a core sentence is a sentence that includes main content information, de-duplication processing may be performed on a web page with same main content that is determined as a duplicate web page, thereby improving accuracy and enhancing an anti-noise capability. In addition, in the embodiments, when comparison is performed, a numeric value obtained by mapping the core sentence is used for comparison, which can reduce a size of data to be calculated, and improve performance.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
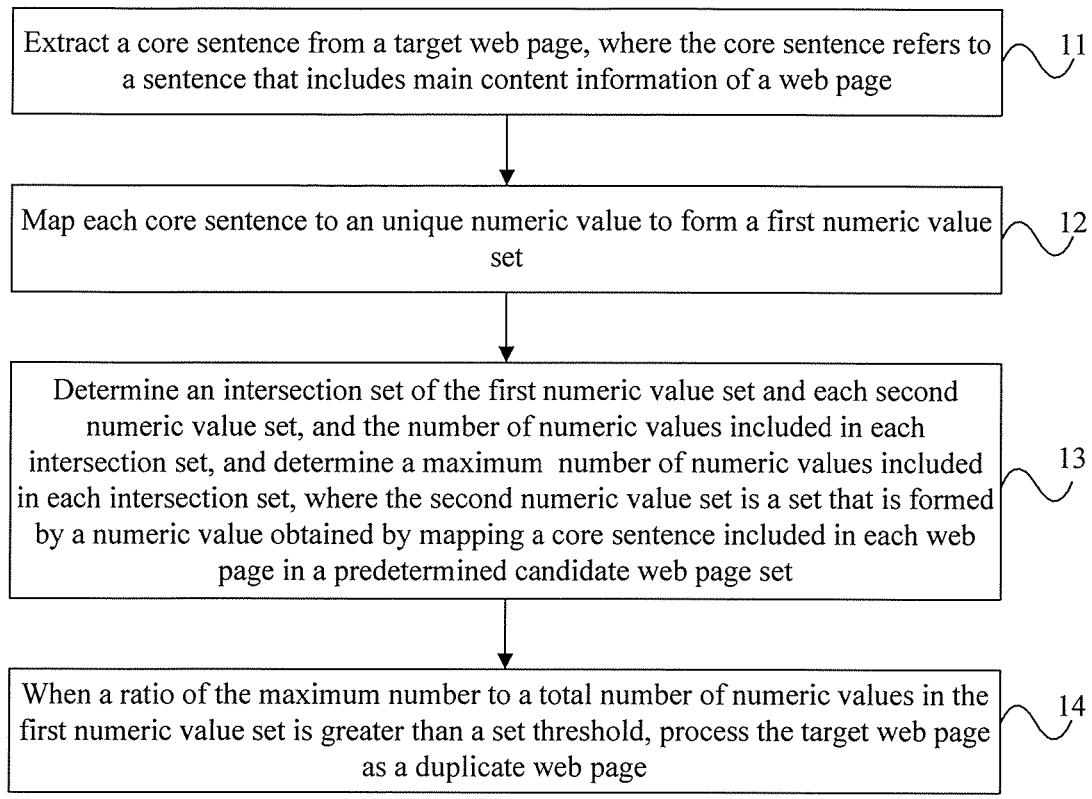
FIG. 1 is a schematic flowchart of an embodiment of a method for de-duplicating a web page according to the present invention.

FIG. 1 is a schematic flowchart of an embodiment of a method for de-duplicating a web page according to the present invention, where the method includes the following steps:

Step 11: Extract a core sentence from a target web page, where the core sentence refers to a sentence that includes main content information of a web page.

The target web page refers to a newly downloaded web page, and whether de-duplication processing is performed on the newly downloaded web page needs to be determined.

The core sentence may also be called a key sentence, which refers to a sentence that includes the main content information of the web page, and it may be understood that a sum of content expressed by all core sentences is basically content to be expressed by the web page.

The core sentence may be determined according to a key word, or may also be determined according to a clustering algorithm.

A key word may be determined in the following manners:

First, a text is preprocessed, for example, sentence segmentation, word segmentation, part-of-speech tagging, and filtering of a stop word and a function word (such as, "ah", "oh", or "of"). The rest is some notional words, for example, "company", "collect", or "set meal".

Second, it may be determined that notional words that are of a preset quantity and with relatively high occurrence frequency are key words according to occurrence frequency of notional words; or a weight value of each notional word is calculated, and notional words that are of a preset quantity and with a relatively large weight value are selected as key words. A term frequency-inverse document frequency (Term Frequency-Inverse Document Frequency, TF-IDF) algorithm may be used to calculate a weight value, where a calculation formula of the TF-IDF algorithm is:

$$w(f_i, d) = N(f_{id}) \times \log\left(\frac{N(f_i)}{N}\right),$$

where $w(f_i,d)$ is a weight value of a word $f_i$ in a text d, $N(f_{id})$ is the number of times that the word $f_i$ occurs in the text d, $N(f_i)$ is the number of training texts that include the word $f_i$, and N is a total number of training texts.

After the key word is determined, the number of key words included in each sentence may be determined. Subsequently, sentences that are of a preset quantity and include more key words are selected as core sentences in descending order of the number of included key words. For example, there are totally five sentences, the number of included key words is separately 6, 5, 3, 2 and 1, and the preset quantity is 2; then, it is determined that a sentence including six key words and a sentence including five key words are core sentences.

The clustering algorithm may be a K-Medoids clustering algorithm (K-Medoids). For the clustering algorithm, clustering may be performed based on a sentence similarity, and one cluster center is obtained for each cluster. In this case, it may be determined that each cluster center is a core sentence. For example, first, K sentences are randomly selected from a text as initial central points (a sentence is considered as one point); then, remaining sentences forms K clusters by performing clustering according to a similarity degree, and such a central point is found in each cluster in an iterative manner: a sum of distances between this central point and other points in the clusters is the smallest, and a sentence to which this central point corresponds is the core sentence. The sentence similarity may be calculated based on vector space, and general content may be calculated by using the following example:

(1) Preprocessing: sentence segmentation, word segmentation, part-of-speech tagging, and filtering of a stop word and a function word ("ah", "oh", "of", and so on). The rest is some notional words, (words with actual meanings, such as, "computer").

(2) A weight value of a word is calculated by using the TF-IDF algorithm to form a word-weight value set.

(3) Calculation of a similarity between sentence 1 and sentence 2 is as follows:

(a) It is assumed that a sentence 1 includes a word vector {A, B, D}, and a corresponding weight value vector is {2, 5, 8}; and a sentence 2 includes a word vector {B, C, D}, and a corresponding weight value vector is {5, 4, 8}.

(b) Two groups of vectors are complemented as {A, B, C, D}, so that the weight value vector of the sentence 1 is changed into {2, 5, 0, 8}, and the weight value vector of the sentence 2 is changed into {0, 5, 4, 8}.

(c) A dot product (a cosine value) of the two weight value vectors is calculated, and a result is a similarity degree of the two sentences.

In addition, after the sentences are converted into the foregoing weight value vectors, a distance between the two sentences is just a distance between points corresponding to the weight value vectors that are converted from the two sentences.

Step 12: Map each core sentence to a unique numeric value to form a first numeric value set.

Each core sentence may be mapped to the unique numeric value by using a hash algorithm, an MD5 algorithm, an exclusive OR algorithm, or the like.

Because there is at least one core sentence, the number of numeric values is at least one, and the at least one numeric value may form a set, which is called the first numeric value set.

Step 13: Determine an intersection set of the first numeric value set and each second numeric value set, and the number of numeric values included in each intersection set, and determine a maximum number of numeric values included in each intersection set, where the second numeric value set is a set that is formed by a numeric value obtained by mapping a core sentence included in each web page in a predetermined candidate web page set.

Because two parties need to be compared for de-duplication, the de-duplication processing is performed only when one party is the same as the other party. In this embodiment, one compared party is the newly downloaded web page, that is, the target web page, and the other party is all or some of web pages (stored web pages for short) that have been locally stored. These web pages that are compared with the target web page may be called candidate web pages, and a set formed by these candidate web pages may be called a candidate web page set. When the target web page is the same as at least one candidate web page in the candidate web page set, the de-duplication processing is performed.

Similar to processing of the target web page, a core sentence included in a candidate web page and a numeric value corresponding to the core sentence are also extracted when the candidate web page is downloaded, and a set that is formed by a numeric value obtained by mapping a core sentence included in each candidate web page may be called a second numeric value set.

After the first numeric value set and the second numeric value set are determined, comparison may be performed. Each second numeric value set is separately compared with the first numeric value set, to obtain a second numeric value set including a maximum same numeric value and a maximum number of included same numeric values, that is, an intersection set of the first numeric value set and the second numeric value set may be obtained, and a maximum number of numeric values included in the intersection set is obtained. For example, the first numeric value set is {1, 2, 3, 4, 5}, and there are three second numeric value sets, which are separately {1, 3, 4}, {3, 5}, and {2}; and then, intersection sets are separately {1, 3, 4}, {3, 5} and {2}, the number of numeric values included in the intersection sets are separately 3, 2, and 1, and therefore, the maximum number is 3.

Step 14: When a ratio of the maximum number to a total number of numeric values in the first numeric value set is greater than a set threshold, process the target web page as a duplicate web page.

For example, in the foregoing example, the maximum number is 3, the total number is 5, and whether 3/5 is greater than a set threshold may be determined subsequently. If 3/5 is greater than the set threshold, it indicates that the target web page is a duplicate web page, and the de-duplication processing needs to be performed, for example, discarding the target web page.

Optionally, if the foregoing ratio is not greater than the set threshold, a numeric value set corresponding to the target web page may be stored to perform other post-processing, for example, extracting an abstract, and establishing a storage index.

Figure 2:
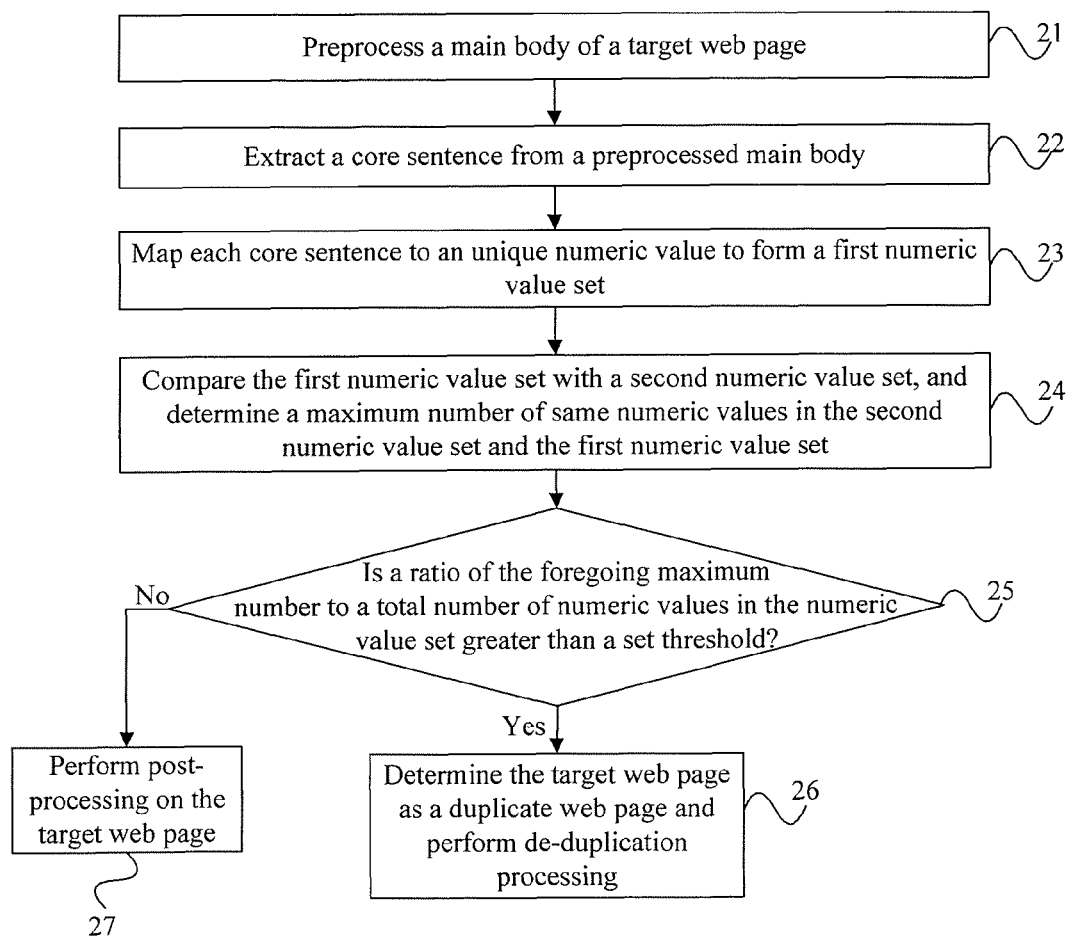
FIG. 2 is a schematic flowchart of another embodiment of a method for de-duplicating a web page according to the present invention.

FIG. 2 is a schematic flowchart of another embodiment of a method for de-duplicating a web page according to the present invention. In this embodiment, that a target web page and all locally stored web pages are compared is used as an example. This embodiment includes the following steps:

Step 21: Preprocess a main body of a target web page.

The preprocessing includes at least one of the following items: sentence segmentation, word segmentation, part-of-speech tagging, filtering of a stop word, and filtering of a function word. These may be implemented by using a common algorithm.

Step 22: Extract a core sentence from a preprocessed main body.

For example, the core sentence is extracted according to a key word or a clustering algorithm.

Step 23: Map each core sentence to a unique numeric value to form a first numeric value set.

For example, the core sentence is mapped to a unique numeric value by using a hash (hash) algorithm, a message digest algorithm 5 (MD5) algorithm, an exclusive OR algorithm, or the like, where these numeric values form the first numeric value set.

Step 24: Compare the first numeric value set with a second numeric value set, and determine a maximum number of same numeric values in the second numeric value set and the first numeric value set.

The second numeric value set is a set that is formed by a numeric value corresponding to a core sentence included in each web page in a predetermined candidate web page set.

Step 25: Determine whether a ratio of the foregoing maximum number to a total number of numeric values in the first numeric value set is greater than a set threshold. If the ratio is greater than the set threshold, execute step 26; if the threshold is not greater than the set threshold, execute step 27.

Step 26: Determine the target web page as a duplicate web page and perform de-duplication processing.

Step 27: Perform post-processing on the target web page.

The post-processing, for example, includes: storing a numeric value set of the target web page, so as to compare with a new web page that is downloaded next time, or performing abstract extraction, storage index establishment, or the like.

For specific content of the foregoing steps 22 to 27, reference may be made to the related description in the embodiment shown in FIG. 1.

In this embodiment, a core sentence is extracted based on a word meaning or a sentence similarity, and a similarity among texts is compared according to main content information, which can improve accuracy of deduplicate checking. Because the core sentence includes the main content information, text modification poses a slight influence on the duplicate checking, thereby enhancing an anti-noise capability. Because numeric values are compared, a size of data to be calculated can be reduced and performance is improved.

Figure 3:
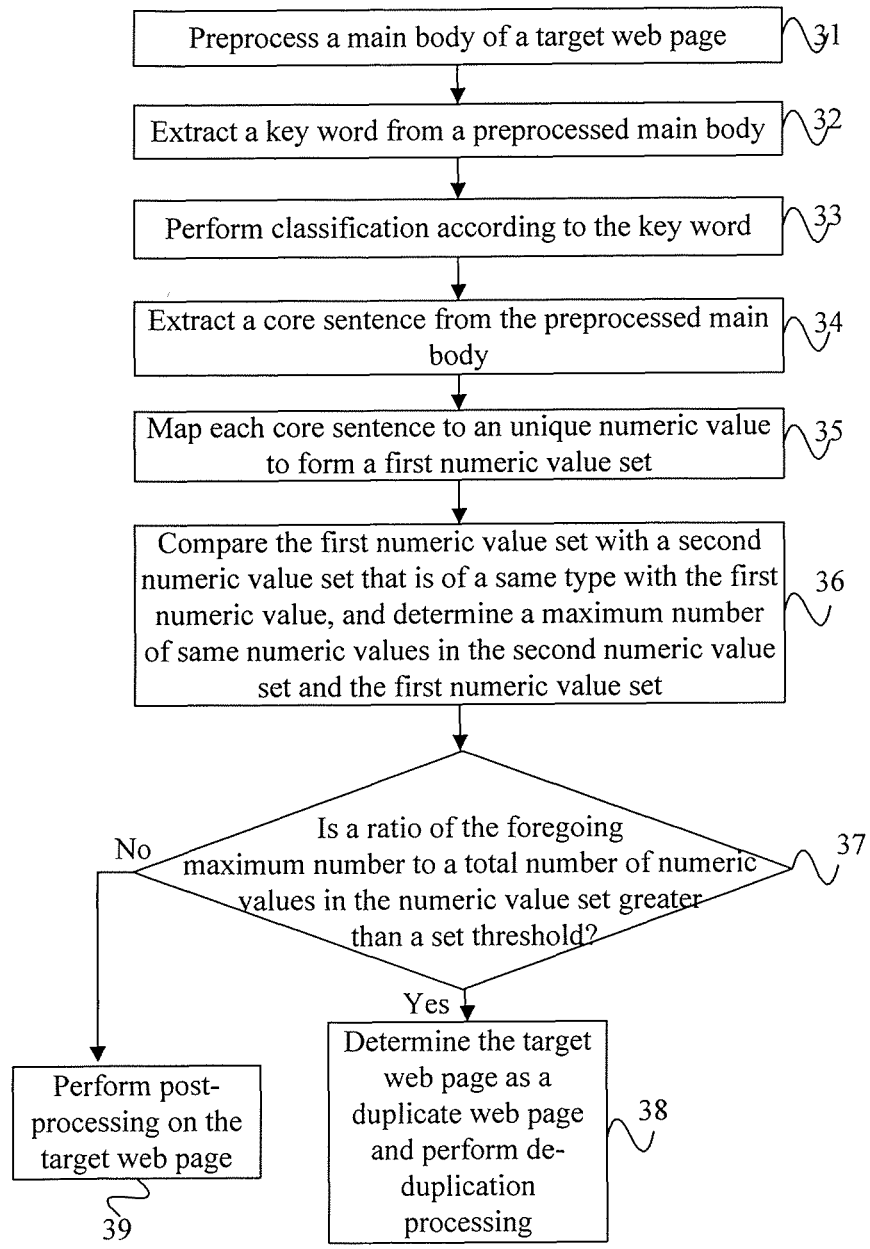
FIG. 3 is a schematic flowchart of another embodiment of a method for de-duplicating a web page according to the present invention.

FIG. 3 is a schematic flowchart of another embodiment of a method for de-duplicating a web page according to the present invention. In this embodiment, that a target web page is first classified and then is compared with all locally stored web pages that are of a same type as the target web page is used as an example. This embodiment includes the following steps:

Step 31: Preprocess a main body of a target web page.

For specific content, reference may be made to step 21.

Step 32: Extract a key word from a preprocessed main body.

For specific content of extracting the key word, reference may be made to the description in the embodiment shown in FIG. 1.

Step 33: Perform classification according to the key word.

For example, the classification is performed according to a type to which the key word belongs. If a majority of the key words belong to the field of Internet, the target web page is classified into Internet. Similarly, a web page may also be classified into a type such as finance and economics, or science and technology.

Step 34: Extract a core sentence from the preprocessed main body.

Step 35: Map each core sentence to a unique numeric value to form a first numeric value set.

Step 36: Compare the first numeric value set with a second numeric value set that is of a same type as the first numeric value, and determine a maximum number of same numeric values in the second numeric value set and the first numeric value set.

A difference from the foregoing embodiment lies in that, in the foregoing embodiment, comparison is performed with a second numeric value set corresponding to each candidate web page that has been stored, and in this embodiment, comparison is performed with a second numeric value set corresponding to a candidate web page of a same type. For example, the target web page belongs to an Internet type, and then the first numeric value set is merely compared with a second numeric value set corresponding to a candidate web page that belongs to the Internet type.

Step 37: Determine whether a ratio of the foregoing maximum number to a total number of numeric values in the numeric value set is greater than a set threshold. If the ratio is greater than the set threshold, execute step 38; if the threshold is not greater than the set threshold, execute step 39.

Step 38: Determine the target web page as a duplicate web page, and perform de-duplication processing.

Step 39: Perform post-processing on the target web page.

For specific content of the foregoing steps 34 to 39, reference may be made to steps 22 to 27.

Based on the foregoing embodiment, in this embodiment, because comparison is performed according to classification, a size of numeric value comparison can also be reduced, and performance can further be improved.

Figure 4:
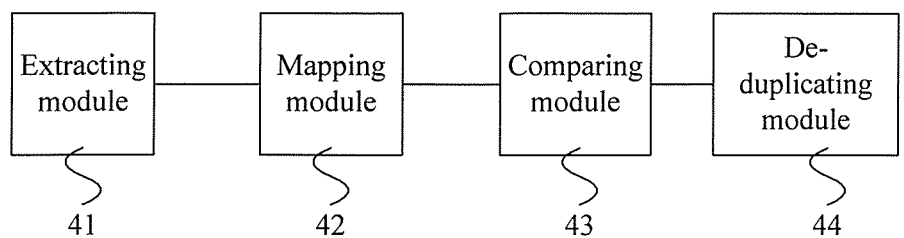
FIG. 4 is a schematic structural diagram of an embodiment of a device for de-duplicating a web page according to the present invention.

FIG. 4 is a schematic structural diagram of an embodiment of a device for de-duplicating a web page according to the present invention. The device is a device for executing the foregoing methods, and the device includes an extracting module 41, a mapping module 42, a comparing module 43, and a de-duplicating module 44; the extracting module 41 is configured to extract at least one core sentence from a target web page, where the core sentence refers to a sentence that includes main content information of the web page; the mapping module 42 is configured to map each core sentence to a unique numeric value to form a first numeric value set; the comparing module 43 is configured to determine an intersection set of the first numeric value set and each second numeric value set, and the number of numeric values included in each intersection set, and determine a maximum number of numeric values included in each intersection set, where the second numeric value set is a set that is formed by a numeric value obtained by mapping a core sentence included in each web page in a predetermined candidate web page set; and the de-duplicating module 44 is configured to: when a ratio of the maximum number to a total number of numeric values in the first numeric value set is greater than a set threshold, process the target web page as a duplicate web page.

For a specific processing process of the extracting module 41, reference may be made to content of step 11; for a specific processing process of the mapping module 42, reference may be made to content of step 12; for a specific processing process of the comparing module 43, reference may be made to content of step 13; and for a specific processing process of the de-duplicating module 44, reference may be made to content of step 14.

Figure 5:
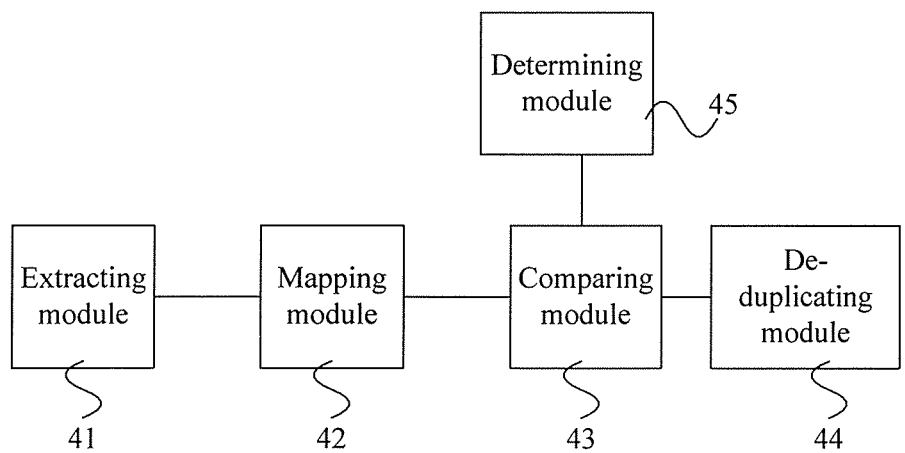
FIG. 5 is a schematic structural diagram of another embodiment of a device for de-duplicating a web page according to the present invention.

Optionally, referring to FIG. 5, the device may further include: a determining module 45, configured to determine a set formed by a stored web page as a candidate web page set; and after a core sentence included in each candidate web page of the candidate web page set is mapped to a unique numeric value, form the numeric value, which is obtained by mapping the core sentence included in each candidate web page, into a second numeric value set.

In addition, for a specific processing process of the extracting module 41, reference may be made to content of step 22; for a specific processing process of the mapping module 42, reference may be made to content of step 23; for a specific processing process of the comparing module 43, reference may be made to content of step 24; and for a specific processing process of the de-duplicating module 44, reference may be made to content of steps 25 to 27.

Figure 6:
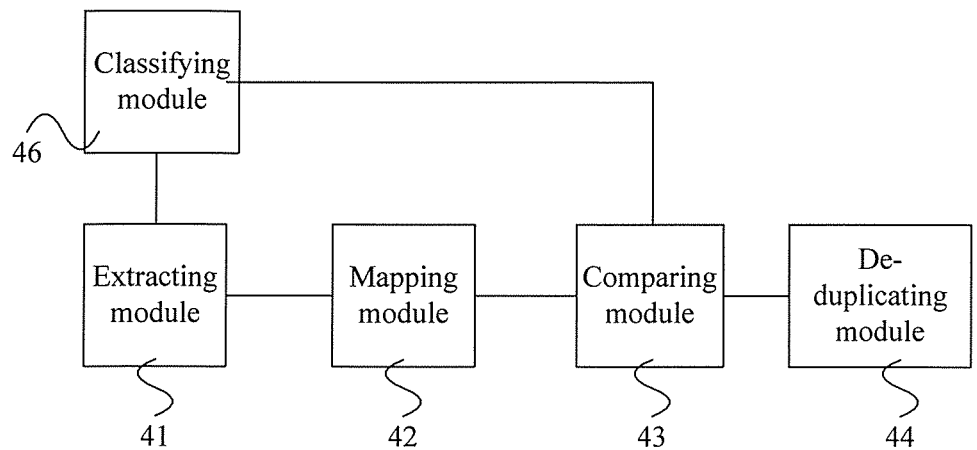
FIG. 6 is a schematic structural diagram of another embodiment of a device for de-duplicating a web page according to the present invention.

Optionally, referring to FIG. 6, the device may further include a classifying module 46, configured to: classify the target web page; determine that a set formed by a stored web page that belongs to a same type as the target web page, is a candidate web page set; and after a core sentence included in each candidate web page of the candidate web page set is mapped to a unique numeric value, form the numeric value, which is obtained by mapping the core sentence included in each candidate web page, into a second numeric value set.

Optionally, the extracting module is specifically configured to:

determine a key word in the main body of the target web page according to term frequency or a weight value of each notional word, and select a preset number of sentences as core sentences in descending order of the number of key words included in each sentence in the main body of the target web page; or perform clustering processing in the main body of the target web page by using a sentence similarity-based clustering algorithm, calculate cluster centers of a preset quantity, and determine each cluster center as a core sentence.

Optionally, the mapping module is specifically configured to:

map each core sentence to a unique numeric value by using a hash algorithm, an MD5 algorithm, or an exclusive OR algorithm.

Optionally, the classifying module is specifically configured to:

determine a key word in the main body of the target web page according to term frequency or a weight value of each notional word, and determine, according to the key word, a type to which the target web page belongs.

For a specific processing process of the classifying module, reference may be made to specific content of step 33.

In addition, for a specific processing process of the extracting module 41, reference may be made to content of step 34; for a specific processing process of the mapping module 42, reference may be made to content of step 35; for a specific processing process of the comparing module 43, reference may be made to content of step 36; and for a specific processing process of the de-duplicating module 44, reference may be made to content of steps 37 to 39.

Figure 7:
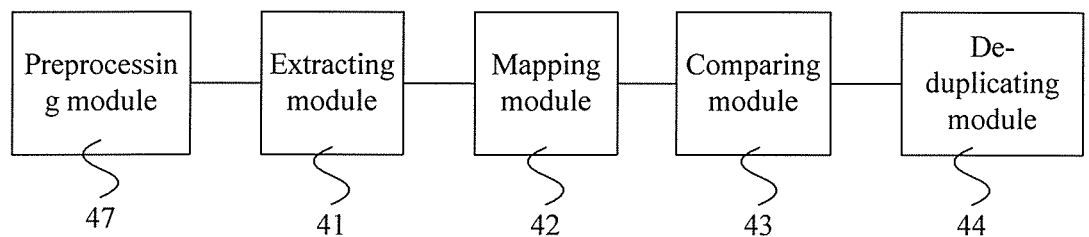
FIG. 7 is a schematic structural diagram of another embodiment of a device for de-duplicating a web page according to the present invention.

Optionally, referring to FIG. 7, the device may further include: a preprocessing module 47, configured to preprocess the main body of the target web page to obtain a notional word in the main body of the target web page, where the preprocessing includes at least one of the following items: sentence segmentation, word segmentation, part-of-speech tagging, filtering of a stop word, and filtering of a function word.

For a specific processing process of the preprocessing module, reference may be made to specific content of step 21.

In this embodiment, a core sentence is extracted. Because a core sentence is a sentence that includes main content information, it may be determined that web pages with same main content are duplicate web pages for de-duplication processing, thereby improving accuracy and enhancing an anti-noise capability. In addition, in this embodiment, when comparison is performed, a numeric value obtained by mapping the core sentence is used for comparison, which can reduce a size of data to be calculated, and improve performance.

Persons of ordinary skill in the art may understand that all or a part of the steps of the method embodiments may be implemented by a program instructing relevant hardware, such as a processor. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method comprising:
    extracting, by a processor, a predetermined number of core sentences from a target web page, wherein each of the extracted core sentences comprise one or more key words of the target web page, wherein the one or more key words comprise notional words that have a frequency of occurrence in the target web page that is greater than a frequency of occurrence of other notional words in the target web page;
    mapping, by the processor, each core sentence to a unique numeric value to form a first numeric value set;
    for each of one or more second numeric value sets, determining, by the processor, an intersection set of the first numeric value set and the second numeric value set, and determining a number of numeric values comprised in the intersection set, wherein each second numeric value set is formed by one or more numeric values to which one or more core sentences comprised in a web page in a predetermined candidate web page set are mapped;
    determining, by the processor, a maximum number of numeric values comprised in each intersection set;
    when a ratio of the maximum number to a total number of numeric values in the first numeric value set is greater than a set threshold, processing, by the processor, the target web page as a duplicate web page; and
    when the ratio of the maximum number to the total number of numeric values in the first numeric value set is not greater than the set threshold, storing, by the processor, a numeric value set corresponding to the target web page for performing post-processing.

2. The method according to claim 1, further comprising:
    determining a set of one or more locally stored candidate web pages as the predetermined candidate web page set; and
    after each of one or more core sentences comprised in each candidate web page in the candidate web page set is mapped to a unique numeric value, forming the one or more unique numeric values into the second numeric value set.

3. The method according to claim 1, further comprising:
    classifying the target web page;
    determining that a set of one or more locally stored candidate web pages belonging to a same type as the target web page, is the predetermined candidate web page set; and
    after each of one or more core sentences comprised in each candidate web page in the candidate web page set is mapped to a unique numeric value, forming the one or more unique numeric values into the second numeric value set.

4. The method according to claim 1, wherein extracting the predetermined number of core sentences from the target web page comprises:
    arranging sentences in descending order of the number of key words comprised in each sentence in a main body of the target web page, and selecting the predetermined number of sentences that have the greatest number of key words as the core sentences.

5. The method according to claim 1, wherein mapping each core sentence to a unique numeric value comprises:
    mapping each core sentence to a unique numeric value by using a hash algorithm, a message digest algorithm 5 (MD5), or an exclusive OR algorithm.

6. The method according to claim 3, wherein classifying the target web page comprises:
    determining at least one of the one or more key words in a main body of the target web page according to term frequency or a weight value of each notional word, and determining, according to the at least one key word, a type to which the target web page belongs.

7. The method according to claim 4, further comprising:
    pre-processing the main body of the target web page to obtain the notional words in the main body of the target web page, wherein the pre-processing comprises at least one of the following items: sentence segmentation, word segmentation, part-of-speech tagging, filtering of a stop word, and filtering of a function word.

8. The method according to claim 1, wherein extracting the predetermined number of core sentences from the target web page comprises:
    performing clustering processing in a main body of the target web page by using a sentence similarity-based clustering algorithm, calculating cluster centers of the predetermined number, and determining each cluster center as a core sentence.

9. A device comprising:
    at least one processor configured to:
        extract a predetermined number of core sentences from a target web page, wherein each of the extracted core sentences comprise one or more key words of the target web page, wherein the one or more key words comprise notional words that have a frequency of occurrence in the target web page that is greater than a frequency of occurrence of other notional words in the target web page;
        map each core sentence to a unique numeric value to form a first numeric value set;
        for each of one or more second numeric value sets, determine an intersection set of the first numeric value set and the second numeric value set, and determine a number of numeric values comprised in the intersection set, wherein each second numeric value set is formed by one or more numeric values to which one or more core sentences comprised in a web page in a predetermined candidate web page set are mapped;
        determine a maximum number of numeric values comprised in each intersection set;
        when a ratio of the maximum number to a total number of numeric values in the first numeric value set is greater than a set threshold, process the target web page as a duplicate web page; and
        when the ratio of the maximum number to the total number of numeric values in the first numeric value set is not greater than the set threshold, store a numeric value set corresponding to the target web page for performing post-processing.

10. The device according to claim 9, wherein the at least one processor is further configured to:
    determine a set of one or more locally stored candidate web pages as the predetermined candidate web page set; and
    after each of one or more core sentences comprised in each candidate web page in the candidate web page set is mapped to a unique numeric value, form the one or more unique numeric values into the second numeric value set.

11. The device according to claim 9, wherein the at least one processor is further configured to:
    classify the target web page;
    determine that a set of one or more locally stored candidate web pages belonging to a same type as the target web page, is the predetermined candidate web page set; and
    after each of one or more core sentences comprised in each candidate web page in the candidate web page set is mapped to a unique numeric value, form the one or more unique numeric values into the second numeric value set.

12. The device according to claim 9, wherein, to extract the predetermined number of core sentences from the target web page, the at least one processor is further configured to:
    arrange sentences in descending order of the number of key words comprised in each sentence in a main body of the target web page, and select the predetermined number of sentences that have the greatest number of key words as the core sentences.

13. The device according to claim 9, wherein the at least one processor is further configured to:
    map each core sentence to a unique numeric value by using a hash algorithm, a message digest algorithm 5 (MD5), or an exclusive OR algorithm.

14. The device according to claim 11, wherein the at least one processor is further configured to:
    determine at least one of the one or more key words in a main body of the target web page according to term frequency or a weight value of each notional word, and determine, according to the at least one key word, a type to which the target web page belongs.

15. The device according to claim 11, wherein the at least one processor is further configured to:
    preprocess the main body of the target web page to obtain the notional words in the main body of the target web page, wherein to preprocess, the at least one processor is configured to perform at least one of the following items: sentence segmentation, word segmentation, part-of-speech tagging, filtering of a stop word, and filtering of a function word.

16. The device according to claim 9, wherein, to extract the predetermined number of core sentences from the target web page, the at least one processor is further configured to:
    perform clustering processing in a main body of the target web page by using a sentence similarity-based clustering algorithm, calculate cluster centers of a preset quantity the predetermined number, and determine each cluster center as a core sentence.

* * * * *